(12) United States Patent
Saviharju et al.

(10) Patent No.: US 7,207,280 B2
(45) Date of Patent: Apr. 24, 2007

(54) COMBUSTION AIR SYSTEM FOR RECOVERY BOILERS, BURNING SPENT LIQUORS FROM PULPING PROCESSES

(75) Inventors: Kari Saviharju, Espoo (FI); Jorma Simonen, Alpharetta, GA (US); Liisa Simonen, Alpharetta, GA (US); Esa Vakkilainen, Helsinki (FI); Esko Mattelmaki, Porvoo (FI)

(73) Assignee: Andritz Oy, Helsinki (FI)

( * ) Notice: Subject to any disclaimer, the term of this patent is extended or adjusted under 35 U.S.C. 154(b) by 0 days.

(21) Appl. No.: 10/747,293

(22) Filed: Dec. 30, 2003

(65) Prior Publication Data

US 2004/0149185 A1    Aug. 5, 2004

Related U.S. Application Data

(63) Continuation of application No. 10/116,108, filed on Apr. 5, 2002, now Pat. No. 6,742,463.

(60) Provisional application No. 60/281,791, filed on Apr. 6, 2001.

(51) Int. Cl.
 *F23G 7/04*    (2006.01)
(52) U.S. Cl. ............................ 110/238; 110/348; 162/31
(58) Field of Classification Search .................. 110/348, 110/238; 162/31
 See application file for complete search history.

(56) References Cited

U.S. PATENT DOCUMENTS 4,940,004 A    7/1990  Jansen 5,007,354 A    4/1991  Uppstu
5,022,331 A    6/1991  Simonen (Continued)

FOREIGN PATENT DOCUMENTS

CA    2245294    3/2000

(Continued)

OTHER PUBLICATIONS

Fridley et al, "Upgrading the Combustion System of a 1956-Vintage Recovery Steam Generator," *Maintenance*, Mar. 1988 (Tappi Journal) pp. 63-69.

(Continued)

*Primary Examiner*—Kenneth Rinehart
(74) *Attorney, Agent, or Firm*—Nixon & Vanderhye P.C.

(57) ABSTRACT

An arrangement is disclosed for supplying an air jet form to the furnace of a recovery boiler, where the furnace has a front wall, a rear wall and side walls. Black liquor spraying devices are disposed on the furnace walls at one or several levels of the furnace. A plurality of air ports are located at several horizontal levels for introducing air into the furnace from an air supply. In the arrangement for the secondary air flows, two horizontal air levels at different elevations are arranged above the lower primary levels and below the black liquor sprayer. Secondary air is supplied from two opposite walls and the air ports from each of the two levels are located so that the air jets are introduced in an interlaced pattern having an even number of jets on one opposite wall and an uneven number of jets on the other opposite wall. The air jets of said at least two air levels are located substantially one above each other in substantially vertical rows.

53 Claims, 2 Drawing Sheets

U.S. PATENT DOCUMENTS

| | | | |
|---|---|---|---|
| 5,121,700 | A | 6/1992 | Blackwell et al. |
| 5,305,698 | A | 4/1994 | Blackwell et al. |
| 5,450,803 | A | 9/1995 | Svensk et al. |
| 5,683,550 | A | 11/1997 | Ryham |
| 5,701,829 | A | 12/1997 | Raak |
| 5,715,763 | A | 2/1998 | Fornetti et al. |
| 5,724,895 | A | 3/1998 | Uppstu |
| 6,279,495 | B1 | 8/2001 | Karidio et al. |
| 6,302,039 | B1 | 10/2001 | MacCallum et al. |
| 6,408,771 | B1 | 6/2002 | Philippe et al. |

FOREIGN PATENT DOCUMENTS

| | | | |
|---|---|---|---|
| EP | 0 668 983 | B1 | 8/1995 |
| EP | 0 668 983 | B2 | 8/1995 |
| WO | WO 94/12829 | | 6/1994 |
| WO | WO 01/31119 | | 5/2001 |

OTHER PUBLICATIONS

Fridley et al, "Upgrading a 1956-Vintage Recovery Steam Generator II," Annual Meeting, Technical Section, Canadian Pulp & Paper Association, Papers Presented Jan. 26 and 27, 1988, Montreal, Quebec (pp. B181-B186).

"Towards a Superior Recovery Boiler Air System", MacCallum, 1992 International Chemical Recovery Conference, *PROCEEDINGS*, TAPPI, Jun. 7-11, (1992) (Book 1) (pp. 45-57).

Combined Physical and Numerical Study of a Multilevel Air System, Siiskonen et al, 1992 International Chemical Recovery Conference, *PROCEEDINGS*, TAPPI, Jun. 7-11 (1992) (Book 1) (pp. 57-63).

International Search Report dated Jul. 8, 2002.

COMBUSTION AIR SYSTEM FOR RECOVERY BOILERS, BURNING SPENT LIQUORS FROM PULPING PROCESSES

RELATED APPLICATION

This application is a continuation of U.S. application Ser. No. 10/116,108, filed Apr. 5, 2002 now U.S. Pat. No. 6,742,463, which claims priority to U.S. Provisional Patent Application Ser. No. 60/281,791, filed on Apr. 6, 2001, and both of which are incorporated by reference herein.

FIELD OF INVENTION

The present invention relates to an arrangement for supplying air in an air jet form to the furnace of a recovery boiler. The furnace has a front wall, a rear wall and side walls. Black liquor spraying devices are disposed on these walls at one or several levels. A plurality of air ports are located on several horizontal levels on said walls for introducing air into the furnace from an air supply. Specifically, the invention relates to an arrangement for organizing the secondary air flows below the black liquor spraying devices.

BACKGROUND OF INVENTION

An optimal supply of combustion air in the lower part of the furnace of a black liquor recovery boiler plays a considerable role in the control of a combustion process in the boiler.

Since the chemical reactions in the kraft recovery boiler are very rapid, the speed of the process becomes substantially dependent on the mixing of combustion air and black liquor. This mixing step determines the burning rate and also has an effect on the process efficiency. Air and black liquor are typically introduced into the boiler through individual ports, and it is particularly important that a rapid mixing in the boiler is effected by the air supply without generating large differences in the upward flow profile. The high velocity "lift" in the center of the furnace is especially harmful as it results in carry-over of the sprayed liquor droplets. The burning symmetry must be controlled throughout the whole cross-sectional area of the boiler and the air supply must be adjusted when required.

Black liquor is generally introduced in the form of considerably large droplets into a kraft recovery boiler so as to facilitate the downward flow of the droplets, and to prevent them from flowing, unreacted (as fine fume), upwards together with the upward flowing gases to the upper part of the boiler. The large droplet size, which results in the droplets being spaced further from each other than in a fine black liquor spray, means that proper mixing is even more important in a recovery boiler. Pyrolysis of black liquor solids produces char as well as combustible gases. The char falls down to the bottom of the furnace and forms a char bed which must be burned.

A stoichiometric amount of air, relative to the amount of black liquor, is introduced into the recovery boiler and additionally, a surplus amount of air is supplied to ensure complete combustion. Too much excessive air, however, causes a loss in efficiency of the boiler and an increase in costs. Air is usually introduced into the boiler on three different levels: primary air at the lower part of the furnace, secondary air above the primary air level but below the liquor nozzles, and tertiary air above the liquor nozzles to ensure complete combustion. Air is usually introduced through several air ports located on all four furnace walls, or only on two opposing walls of the furnace.

Primary air is typically 20–35% of the total air supplied into the furnace, depending on liquor and dry solids content of the liquor. The task of the primary air is to keep the char bed from rising into air ports of the furnace. Secondary air is typically 35–60% of total air, and tertiary air, which may be distributed into several levels in vertical direction, is typically 10–40% of the total air. More than three air levels for introducing air into the furnace may be arranged in the boiler.

Mixing of black liquor and air is difficult because of the upflow of gas which is formed in the center part of the boiler, through which it is difficult for the weak secondary air flow to penetrate. More specifically, the primary air flows, supplied from the sides in the bottom part of the boiler, collide with each other in the center part of the boiler and form, with secondary air flow pattern, in the center part of the boiler, a gas flow flowing very rapidly upwards, catching flue gases and other incompletely burnt gaseous or dusty material from the lower part of the furnace. This gas flow, also called a "droplet lift", also catches black liquor particles flowing counter-currently downwards and carries them to the upper part of the boiler, where they stick to the heat surfaces of the boiler, thus causing fouling and clogging. In the center part of the boiler, the speed of the upwards flowing gas may become as much as four times as great as the average speed of the gases as a result of incomplete or weak mixing. Thus, a zone of rapid flow is formed in the center part of the boiler, and this renders mixing of flue gases from the side of the flow very difficult to achieve.

The "droplet lift" mentioned above, results in such a situation where the tertiary air(s) has (have) to burn not only the unburned gases from combustion (CO, $H_2S$, $NH_3$, etc.), but the unburned char from the droplets as well. As the combustion rate for char is much slower than for the unburned gases, increased excess oxygen has to be used to ensure complete combustion. Then the flue gas leaving the furnace contains higher amounts of residual CO and $H_2S$, and the utilization of the furnace is less effective than would be possible.

Current secondary air arrangements are also characterized by at least one secondary air level where secondary air ports are placed close to another in horizontal direction. This leads to mixing patterns where furnace gases are circulated in vertical direction, with the above mentioned "lift", i.e. they flow towards the walls and then turn up (or down) and follow the main flue gas direction.

Another variation of the secondary air design is to use partial interlaced jets (e.g. U.S. Pat. Nos. 5,121,700, 5,305,698), whereby a large jet opposes a small jet. The large and small jets are alternated between the two opposite walls used.

U.S. Pat. No. 5,724,895 discloses an arrangement for feeding combustion air. In this system, a more favorable flow pattern in furnaces can be achieved by replacing vertical mixing by horizontal mixing, whereby a strong central flow channel, upward "lift", can be prevented. This horizontal mixing is applied for the whole furnace. The horizontal mixing is improved by disposing additional air inlet ports e.g., at more than six different elevations in a pattern of vertical spaced-apart rows above the lowest air levels.

In the method of U.S. Pat. No. 5,454,908 a portion of combustion air is introduced into a recovery boiler at a distance above the black liquor inlet so as to provide a reducing atmosphere with a residence time of at least three seconds between the black liquor inlet and the introduction of said portion of combustion air. A drawback of the described arrangement is a high vertical combustion area, reaching in extreme cases the bullnose of the furnace. As this combustion area has a reducing atmosphere, at least locally, more expensive materials have to be used in the furnace to a higher position than would be needed if combustion took place lower in the furnace. Other disadvantages of the air systems, where combustion takes place high up in the furnace include high furnace outlet temperature resulting in large convective heat transfer surfaces later in the boiler, lower temperature in the lower furnace, and more expensive layout. The lower temperature in the lower furnace does not allow as high sulfidity without $SO_2$ emissions as a combustion system having a higher lower furnace temperature does.

SUMMARY OF INVENTION

The present invention provides an improved air supply system of combustion air to a recovery boiler. Particularly, a secondary combustion air supply is provided in which either local and/or central upward gas flows having a high velocity compared to an average upward gas velocity are efficiently avoided. Another feature of the invention is to enable a constant penetration of combustion air into the boiler at different loading levels. A further feature of the invention is to produce a better mixing of black liquor and combustion air in the furnace. The improved air supply arrangement of this invention is also designed to reduce the amount of harmful emissions from the boiler furnace.

The present invention may be embodied in a recovery boiler having a furnace that comprises:

two horizontal air levels at different elevations are arranged above the lowest air level or levels and below the black liquor spraying level or levels, air is supplied from two opposite walls on said two levels and the air ports on each level are located so that the air jets are introduced in an interlaced pattern having an even number of jets on one opposite wall and an uneven number of jets on the other opposite wall, and the air jets of said two air levels are located in substantially vertical rows.

According to an embodiment of the invention, secondary air on two air levels is introduced only from the two opposite walls, preferably from the front and rear walls. Substantially no air is supplied from the two remaining walls, i.e., the side walls. In the interlaced pattern, an air flow coming from an air port located on a wall having an even number of air jets is directed in between two adjacent air ports of the opposite wall having an uneven number of air jets. Correspondingly, the air jets coming from the wall having an uneven number of air jets are directed substantially directly in a horizontal plane towards the opposite wall. The air jets coming from the opposite walls by-pass each other without actually colliding with each other.

Thus, on the two secondary levels, the lateral arrangement of the jets on one level sideways is symmetrical. On the wall having an uneven number of air jets, e.g. three, the middle air jet is located substantially on the center line of the wall, and the other jets are located within an equal distance on both sides of the middle jet. On the opposite wall having an even number of jets, two in this example, the jets are located laterally midway between the jets on the opposite wall. Thus, the jet arrangement is symmetrical in relation to the vertical plane parallel to the remaining walls (i.e. the walls having no secondary air jets) and passing through the center lines of the walls having the secondary air jets.

The present invention employs the following principles in order to avoid strong vertical gas flows, but still to obtain effective mixing in the furnace between combustion air and unburned/burning liquor droplets:

strong secondary air jets (strong air jets below black liquor spraying devices).

arrange these jets so that they do not collide against each other, which easily generates strong upflow jets and unwanted upflow profile for the gases in the furnaces. Instead, strong shearing flows should be generated to obtain good mixing.

minimize suction of gases in vertical direction into these jets above the liquor spraying devices as this increases gas flow up.

minimize suction of liquor droplets from liquor sprays into tertiary air jets.

cover the tertiary air stage(s) with several jets, which cover the furnace cross section evenly and well in order to prevent the formation of vertical jets that may punch the final combustion area where the final combustion of the unburned gases cannot take place. Also, here the jets should not collide against each other but generate strong shearing flows and good mixing.

According to a preferred embodiment of the invention, there is a distance, V, in vertical direction between the horizontal air levels, when measured from the lateral center lines of the air ports of the air levels. This distance, V, fulfills the following formula: $V/L \leq 0.5$, where L is the distance between two adjacent air ports on the same air level, when measured from the longitudinal center lines of the adjacent air ports. Preferably, V/L is 0.25–0.5. Typically, the vertical distance, V, is 1–2 meters.

Preferably the air ports located one above the other are positioned in a vertical row so that they are located on the same straight vertical line. The invention covers also an embodiment in which the air ports laterally deviate so that there a transverse distance, D, between the air ports above each other. The transverse distance is a distance between the longitudinal center lines of the ports one above the other. D is less than 1.5×H or less than 1.5×W depending on which number is greater. H is the height of the highest air port and W is the width of the widest air port.

According to an embodiment of the invention there is only one air level below the two secondary air levels. According to another embodiment, the number of the lowest air levels below the two secondary air levels is two. The air jets of the air level which is located higher in vertical direction below the two secondary air levels are arranged in an interlaced pattern on two opposite walls, preferably on the front and rear walls, so that the number of air jets is greater by one than the number of air jets of the two secondary air levels on the same wall. For example, if the secondary air level has one air jet on the front wall and two jets on the rear wall, the above-mentioned lower air level has two air jets on the front wall and three jets on the rear wall. However, the air velocity is lower on this lower air level. On this air level which, thus, is located above the lowest air level and below the two secondary air levels, and which can be called a low-secondary or high-primary air level, the air jets are arranged also on the remaining opposite walls, i.e., preferably on the side walls. The air jets on the side walls are smaller than the air jets on the front and rear walls.

An embodiment of the invention is directed also to an arrangement for supplying secondary air in an air jet form to the furnace of a recovery boiler, said furnace having a front wall, a rear wall and side walls, black liquor spraying devices disposed on said walls on a level and a plurality of air ports located on several horizontal levels on said walls for introducing air into the furnace from an air supply, said arrangement comprising: one horizontal air level is arranged above the lowest air level or levels and below the black liquor spraying level or levels, and air is supplied from two opposite walls on said level and the air ports are located so that the air jets are introduced in an interlaced pattern having an even number of jets on one opposite wall and an uneven number of jets on the other opposite wall. The air port has an area, A, and a width, W, and the ratio of the area to the width to the power of 2 ($A/W^2$) is more than 4, preferably more than 10.

SUMMARY OF DRAWINGS

The invention will be described in more detail with reference to the attached drawings, in which.

DETAILED DESCRIPTION OF AN EMBODIMENT OF THE INVENTION

Figure 1:
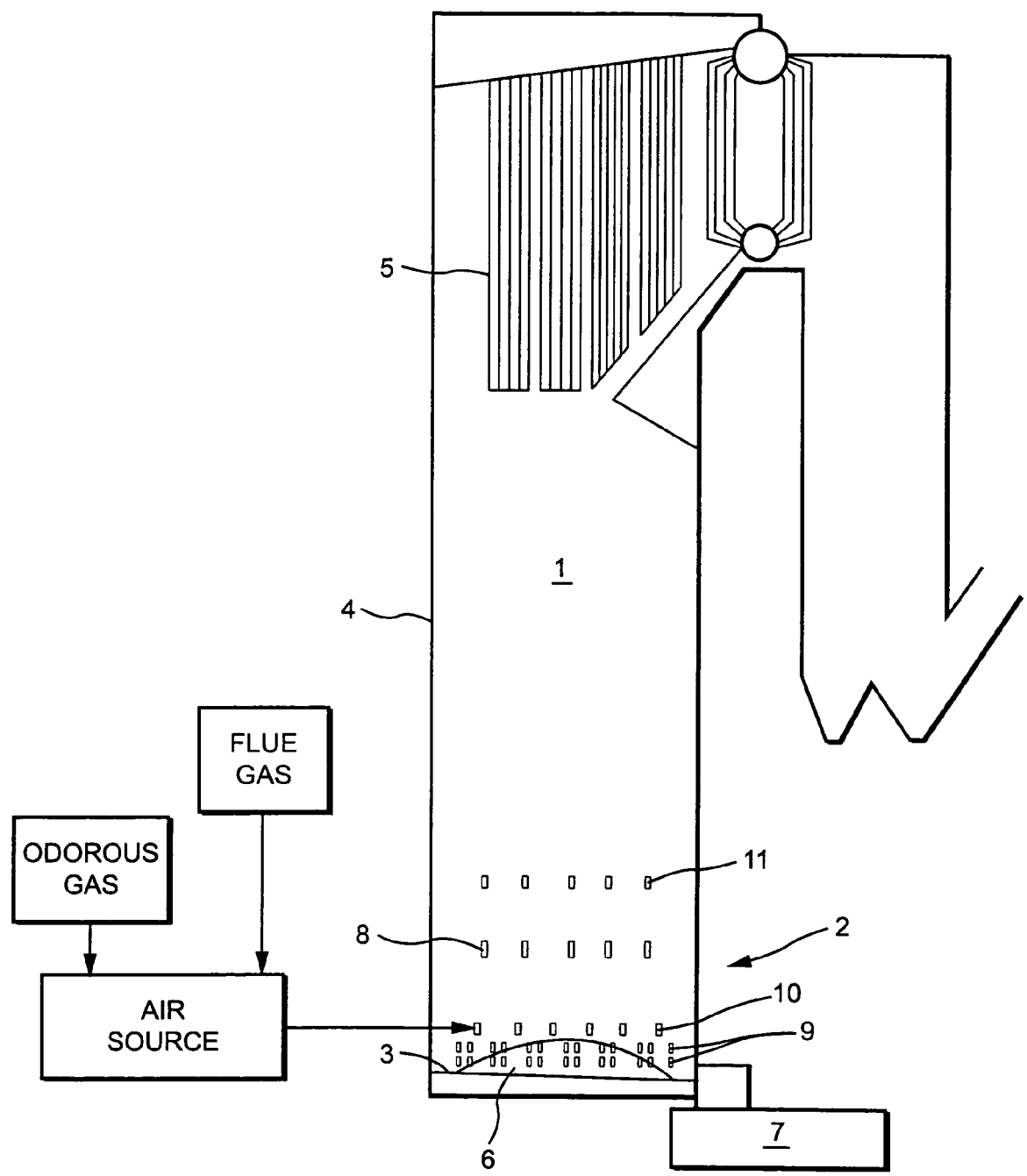
FIG. 1 illustrates a schematic cross-sectional view of a recovery boiler.

FIG. 1 illustrates a conventional recovery boiler. The boiler 1 comprises a furnace 2 provided with a bottom, boiler walls 4, and a super heater 5. In the combustion process, a bed 6 of dried and partly burnt black liquor is formed at the bottom of the furnace. Melt chemicals flow through the porous bed to the bottom of the furnace, from where they are transferred as an overflow via melt chutes 3 to a dissolving tank 7. Black liquor is introduced to the furnace through openings in zone 8. Air is introduced from three different levels: primary air ports 9, secondary air ports 10 and tertiary air ports 11.

As known, the recovery boiler furnace has a front wall, a rear wall and side walls. Black liquor spraying devices are disposed on these walls at one or several levels. A plurality of air ports are located on several horizontal levels on said walls for introducing air into the furnace from an air supply.

The air ports of the furnace for supplying secondary air are arranged in a specific way. In connection with this invention, the secondary air is used to refer to the air that is introduced between the lowest air level, i.e., the primary air level, and the black liquor spraying level or levels. In the arrangement of the invention the secondary air is supplied as interlaced jets of air projected from opposite walls on at least two levels, preferably on two levels.

Figure 3:
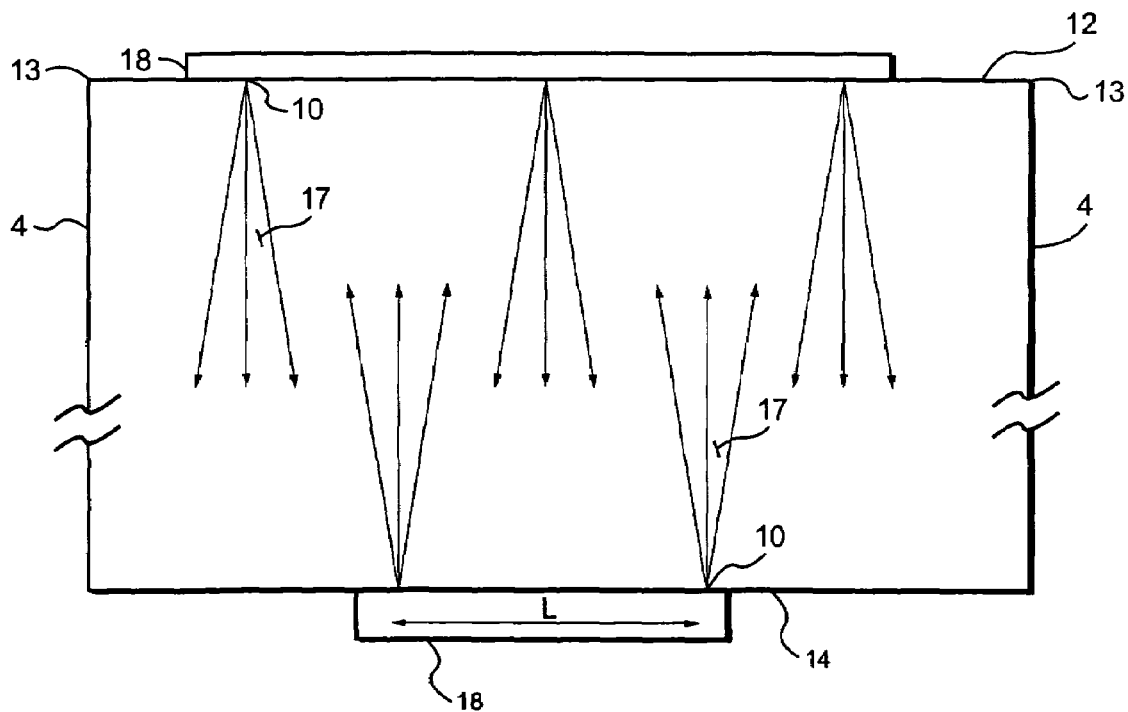
FIG. 3 illustrates a plan view of the lower furnace of a recovery boiler with an arrangement of air jets according to an embodiment of the invention.

Each secondary air level has an even number of ports for jets on one opposite wall and an uneven number of ports for jets on the other opposite wall, as shown in FIG. 3. In this interlaced pattern, an air flow coming from an air port located on a wall having an even number of air ports is directed in between two adjacent air ports of the opposite wall having an uneven number of air ports. The air flows coming from the opposite walls by-pass each other without actually colliding with each other. The air ports of the different air levels are located on the same walls, e.g., on the front and rear walls.

Figure 2:
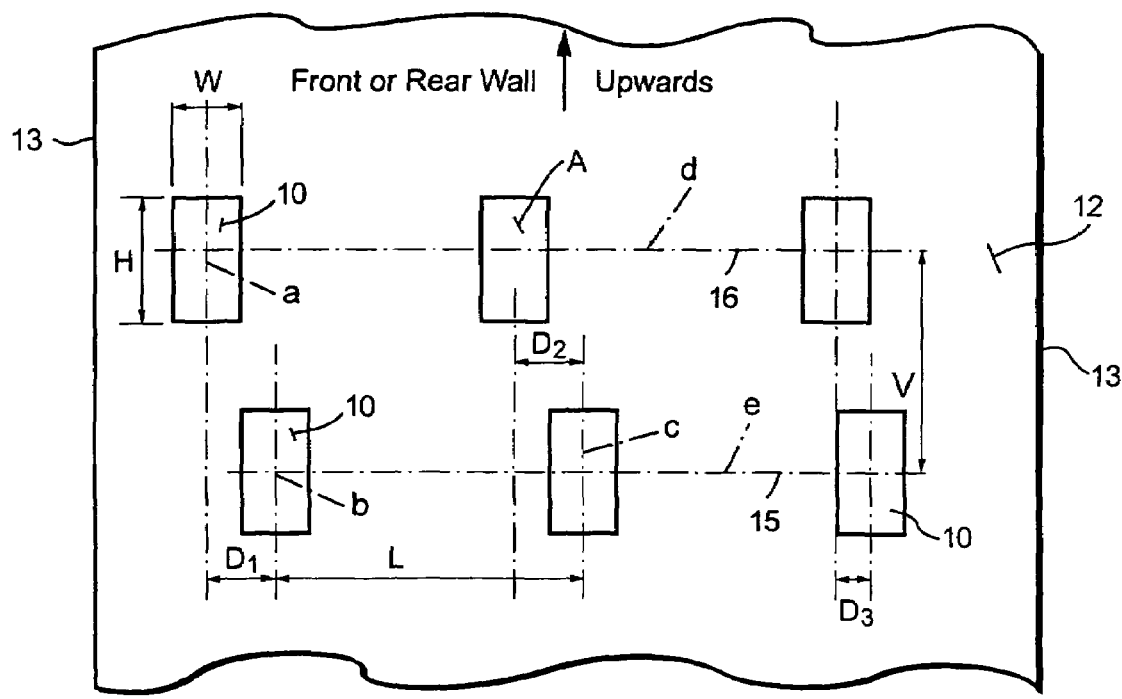
FIG. 2 illustrates a side view of the lower furnace of a recovery boiler with an air port arrangement according to an embodiment of the invention.

FIG. 2 is a schematic side view of a lower portion of one wall 12 in the boiler 1, such as a rear wall that is opposite to a front wall 14 (see FIG. 3). The wall 12 shows the air ports 10 for the secondary air. The air ports for the primary air are below the air ports 10, but are not shown in FIG. 2. The wall section shown in FIG. 2 is below the black liquor injection nozzles and above the primary air ports 9. The side edges 13 of the wall abut with other side walls 4 in the furnace. The secondary air ports 10 shown in FIG. 2 may be also arranged on an opposite wall 14 of the furnace (as is shown in FIG. 3) and may also be arranged on more than two walls in the furnace. The secondary air ports 10 are supplied with secondary air by an air supply 18, which provides air for combustion from atmospheric air, by circulating flue gases recovered from the boiler, and/or from a supply of odorous gases from another process in the plant.

The secondary air ports are arranged it a first row at a first horizontal level 15 and a second row at a second horizontal level 16. The secondary air ports 10 are aligned in elevational levels one above the other. The air ports of each level 15, 16 are located in rows so that there is a transverse distance L in a horizontal direction between adjacent ports 10 at the same level. In addition, the secondary air ports may or may not be vertically aligned between the two rows 16, 15. As shown in FIG. 2, the air ports in a first elevation 15 are offset from their vertically-adjacent ports in the second elevation 16 by a horizontal offset distance $D_x$. The distance $D_x$ is an offset distance between the longitudinal center lines of two vertically adjacent air ports. This distance $D_x$ is zero for air ports that are vertically aligned between the two rows.

In FIG. 2, $D_1$ is a distance between longitudinal center lines a and b, which correspond respectively to vertically-adjacent secondary air ports 10 one above the other. Similarly, $D_2$ and $D_3$ are the distances between the centerlines of other pairs of vertically adjacent secondary air ports. $D_1$ is generally less than 1.5×H or less than 1.5×W depending on which number is greater. H is the height of the tallest air port 10 and W is the width of the widest air port of each pair of vertically adjacent air ports. Preferably the transverse distance ($D_x$) is less than 1.0×H or less than 1.0×W, whichever is greater. Typically the transverse distance $D_x$ between two vertically adjacent air ports is in a range of 0.075 to 0.16 meters. Because of the water circulation in the cooling tubes that form the walls 4, 12, 14 of the furnace, it may be advantageous to have the transverse distance ($D_x$) between the vertically adjacent air ports confined to the ranges stated herein.

In addition, the two secondary air levels 15, 16 are located so that there is a vertical distance (V) between the secondary air levels, 15, 16. The vertical distance V is measured as a distance in a vertical separation between the lateral center lines (d, e in FIG. 2) of the rows 15, 16 of secondary air ports. This distance V should preferably fulfill the following formula: $V/L \leq 0.5$, where L is the distance between two adjacent air ports on the same row 15, 16, when measured from the longitudinal center lines of the adjacent air ports. Typically V/L is 0.05–0.5, and preferably 0.25–0.5. Typically the vertical distance, V, is 1–2 meters.

The value of the distance L between secondary air ports in the same row depends on, for example, the number of secondary air ports in that row on the wall of the furnace. There may be an even number of ports in a row on one wall and an odd number of ports in the same row on the opposite wall. When there is an even number of ports in a row on one wall and an uneven number of ports in the opposite row on the opposite wall, the value of L used in the above formula may be the minimum of L value in the two opposing rows.

Preferably, the shape of the secondary air ports 10 is close to a hexahedral form to minimize the area of uncooled fin areas. The air ports have an area (A) and a width, W.

Preferably the ratio between the port area (A) and the square of the width (W) is greater than 4, which ratio may be expressed as $A/W^2 \geq 4$, but this ratio may also be smaller than 4. For instance, the ratio of $A/W^2$ can vary from 5 to 10. A feature of the invention is that each air port is closer to the air port located above it than to an adjacent air port at its same level. In the extreme case the vertical distance V is close to 0, whereby two air ports located above each other are to be replaced with one air port that is very high and narrow. Typically, the lowest primary air port level is located about 0.7 to 1.0 meters from the floor of the furnace (from the smelt level). The distance between the primary level and the lowest secondary levels 15, 16 having air jets only on two walls is about 0.8–1.5 meters, in which case the lowest secondary level 15 is about 1.5–2.5 m from the floor of the furnace (from the smelt level).

The air ports of the same secondary air level do not have to be located exactly at the same elevation on the opposite walls. This means that the air jets on the opposite walls on the same air level are not located in the same horizontal plane. However, the difference between the elevations of the air ports of the same level on the opposite walls is less than 10% of the depth of the furnace.

According to a preferred embodiment the air jets of the secondary air levels are located on the front and rear walls of the furnace, but the arrangement of the invention can be applied to the side walls of the furnace as well.

The number of jets on the secondary air levels is characterized by the following numbers, depending on the spent liquor dry solids combustion capacity of a recovery boiler capacity:

- where the boiler capacity is less than 500 metric tons of dry solids per day (DS/d): 1+2 jets per secondary air level (6 jets together in the case of two air levels).
- capacity is 500–1500 metric tons D.S./d: 1+2 or 2+3 jets per level.
- capacity is 1500–2500 metric tons D.S./d: 2+3 or 3+4 jets per level.
- capacity is 2500–4000 metric tons D.S./d: 2+3, 3+4 or 4+5 jets per level.
- capacity is greater than (>) 4000 metric tons D.S./d: 3+4, 4+5, 5+6 or 6+7 jets per level.

Where "1+2 jets per level" means that one air port providing an air jet is located on one of the opposite walls and two ports for jets are on the other of the opposite walls. FIG. 3 shows a 2+3 arrangement of air ports on one level providing interlaced air jets.

As shown in the single secondary air port level shown in a top view in FIG. 3, the ports 10 (and hence air jets 17) are arranged such that there is an interlaced pattern of air jets projecting in towards the center of the furnace. On a first wall, such as a rear wall 12, of the furnace there are three air ports arranged in one elevational level as the secondary air ports providing the three jets shown in FIG. 3. The opposite wall, such as the front wall 14, has two air ports 10. The air ports in one level do not face directly across each other on the opposite walls. Rather, the air ports at the same elevational level, e.g., secondary air levels, but on opposite walls are offset from each other. The offset of opposite air ports on opposite walls promotes an interlaced pattern of air jets projecting towards the center of the furnace. The interlaced patter of air jet can be achieved by arranging the ports at the same elevational level such that an odd number of ports are on one wall and an even number of ports on the opposite wall of the furnace.

The velocity of the secondary air supplied through the air ports into the furnace is preferably at least 40 m/s (meters per second). In order to prevent the formation of vertical jets that may punch the final combustion area where the final combustion of the unburned gases should take place, the number of air jets on each tertiary air level in the claimed arrangement is higher than the number of the air jets on the secondary air levels. Preferably, the vertical distance between the lowest tertiary air level and the black liquor spraying level is more than two times greater than the vertical distance between each secondary air level.

The combustion air supply 14 can be connected to means for conveying flue gas from the recovery boiler in order to recirculate a portion of the flue gas into the furnace. The air supply 14 can also be connected to a line for odorous gases for introducing the gases into the furnace.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention covers also an embodiment according to which the air jets described above form a first set of air jets. In addition to the first air jets, a second set of air jets is arranged on the opposite walls at the horizontal air levels so that first and second air jets form opposed pairs and the air stream through each second jet is less than 25% of the air stream of the opposed first jet. The major part, i.e., more than 75%, of the air is introduced through the first jets. The air ports for the second air jets are arranged one above the other in the same manner as the first air ports described above.

According to another embodiment of the invention a second set of air ports is arranged close to or at the corners of the furnace, whereby the air stream of the second jets is less than 25% of the air stream of the first jets. Preferably, one second air port is located at each corner. Gas streams in the corner areas of the furnace can be controlled by means of these weaker air jets. However, preferably the entire air stream is introduced into the furnace through the first set of jets, in which case the furnace has no second air jets. flue gas into the furnace. The air supply 14 can also be connected to a line for odorous gases for introducing the gases into the furnace.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention covers also an embodiment according to which the air jets described above form a first set of air jets. In addition to the first air jets, a second set of air jets is arranged on the opposite walls at the horizontal air levels so that first and second air jets form opposed pairs and the air stream through each second jet is less than 25% of the air stream of the opposed first jet. The major part, i.e., more than 75%, of the air is introduced through the first jets. The air ports for the second air jets are arranged one above the other in the same manner as the first air ports described above.

According to another embodiment of the invention a second set of air ports is arranged close to or at the corners of the furnace, whereby the air stream of the second jets is less than 25% of the air stream of the first jets. Preferably, one second air port is located at each corner. Gas streams in the corner areas of the furnace can be controlled by means of these weaker air jets. However, preferably the entire air stream is introduced into the furnace through the first set of jets, in which case the furnace has no second air jets.

The invention claimed is:

1. A furnace of a recovery boiler comprising:
   a front wall, a rear wall and side walls to the furnace,
   at least one black liquor spraying device disposed at or above a black liquor spray horizontal elevation on at least one of said walls, wherein said black liquor spray horizontal elevation is substantially devoid of air ports;
   a plurality of primary air ports on at least one of said walls;
   a first horizontal elevation of secondary air ports arranged on opposite walls of said furnace and a second horizontal elevation of secondary air ports on said opposite walls, wherein substantially all secondary air enters the furnace through said ports in the first and second horizontal elevations and said first and second horizontal elevations of secondary air ports are vertically lower on said walls than the black liquor horizontal spray elevation and are vertically above the primary air ports;
   the secondary air ports in each of said first and second horizontal elevations on said opposite walls are such that the air ports for each horizontal elevation project a pattern of air jets into the furnace from said opposite walls;
   wherein the primary air ports includes an upper horizontal elevation of the primary air ports each have a vertical centerline that is offset horizontally from a vertical centerline of the secondary air ports in the first horizontal elevation of air ports.

2. A furnace in accordance with claim 1, wherein said opposite walls are the front and rear walls of the furnace and the pattern air jets is an interlaced pattern.

3. A furnace in accordance with claim 1, wherein a vertical distance V is between horizontal centerlines of the secondary air ports in the first and second horizontal elevations, and the distance V complies with a formula: $V/L \leq 0.5$, where L is a horizontal distance between two vertical centerlines of adjacent secondary air ports in the first or second horizontal elevations.

4. A furnace in accordance with claim 3, wherein V/L is a ratio in a range of 0.25 to 0.5.

5. A furnace in accordance with claim 3, wherein the vertical distance V is in a range of 1 to 2 meters.

6. A furnace in accordance with claim 1 wherein a velocity of air jets passing through the secondary air ports on said at least first and second horizontal air elevations is at least 40 meters per second (m/s).

7. A furnace in accordance with claim 1 wherein the furnace has at least one tertiary elevation of tertiary air ports arranged above the black liquor spraying level, and the tertiary air ports on said at least one tertiary elevation are greater in number than a number of secondary air ports on an upper horizontal level of the first horizontal elevation and the second horizontal elevation.

8. A furnace in accordance with claim 7, wherein a vertical distance between a lowest of the at least one tertiary air elevation and the black liquor spray horizontal elevation is at least two meters.

9. A furnace in accordance with claim 1, wherein the secondary air ports of said first and second horizontal elevations are aligned substantially vertically.

10. A furnace as in claim 1
    wherein the air jets of said first and second horizontal secondary air elevations are located substantially one above the other in substantially vertical columns of air jets, wherein a number of secondary air jets in each of said substantially vertical columns is no more than a pair of secondary air jets.

11. A furnace in accordance with claim 1, wherein a vertical distance (V) separates the first and second horizontal secondary air elevations and a horizontal length (L) is a distance between adjacent secondary air ports in a same level, wherein a ratio (V/L) is less than or equal to 0.5.

12. A furnace in accordance with claim 11, wherein V/L is between 0.25 and 0.5.

13. A furnace in accordance with claim 11, wherein the vertical distance (V) is between one to two meters.

14. A furnace in accordance with claim 1, wherein the primary air elevation has one horizontal elevation of air ports.

15. A furnace in accordance with claim 1, wherein the primary air elevation has two horizontal primary elevations both of which are below the first and second horizontal elevations of second air ports, wherein an upper primary elevation of the two horizontal primary elevations has a greater number of air jets than does the secondary air jets of each of the first and second horizontal elevations of secondary air.

16. A furnace in accordance with claim 1, wherein a velocity of the secondary air is at least 40 meters per second.

17. A furnace in accordance with claim 1, wherein the furnace further comprises at least one tertiary air elevation above the black liquor injection horizontal level, and wherein a number of air jets on each tertiary air elevation is greater than a number of the secondary air jets on each of the first and second horizontal elevations.

18. A furnace in accordance with claim 17, wherein a vertical distance between a lowest tertiary air elevation and the black liquor injection horizontal elevation is at least two meters.

19. A furnace in accordance with claim 1, wherein the wherein the secondary air ports in said first secondary horizontal elevation are vertically aligned with the secondary air ports in the second horizontal level, such that a transverse distance (D) between an air port in the first horizontal elevation and an adjacent air port in the second horizontal elevation is less than 1.5 times the height of a highest secondary air port.

20. A furnace in accordance with claim 19, wherein the transverse distance is in a range of 0.075 meters (in) to 0.16 m.

21. A furnace in accordance with claim 1, wherein the air supply is connected to a source of flue gas taken from the recovery boiler.

22. A furnace in accordance with claim 1, wherein the air supply is connected to a line for odorous gases for introducing the gases to the furnace.

23. A furnace as in claim 1 wherein
    said secondary air ports on each of said opposite walls are arranged in substantially vertical columns such that a secondary air stream from a lower secondary air port is substantially vertically aligned with a secondary air stream from an upper secondary air port, wherein no more than two secondary air streams are substantially vertically aligned and further wherein the secondary air ports jet the secondary air streams substantially horizontally into the furnace.

24. A furnace in accordance with claim 23, wherein the air ports of said first and second horizontal secondary air elevations are located on the front and rear walls of the furnace.

25. A furnace in accordance with claim 23, wherein the secondary air ports are confined to a first and a second horizontal elevation of secondary air ports.

26. A furnace in accordance with claim 23 wherein substantially no secondary air is introduced from walls of the furnace other than the opposite walls.

27. A furnace in accordance with claim 23 wherein the primary air elevation has one horizontal elevation of air ports.

28. A furnace in accordance with claim 23 wherein the primary air elevation has two horizontal primary elevations both of which are below the second air ports.

29. A furnace in accordance with claim 23 wherein a velocity of the secondary air is at least 40 meters per second.

30. A furnace in accordance with claim 23 wherein the furnace further comprises at least one tertiary air elevation above the black liquor injection horizontal level, and wherein a number of air jets on each tertiary air elevation is greater than a number of secondary air jets at a common elevation.

31. A furnace in accordance with claim 23 wherein a vertical distance between a lowest tertiary air elevation and the black liquor injection horizontal elevation is at least two meters.

32. A furnace in accordance with claim 23 wherein the secondary air streams from the secondary air ports on one of said walls interlace with the secondary air streams from the secondary air ports on an opposite wall.

33. A furnace in accordance with claim 23 wherein each of the pairs of ports in vertical columns are vertically aligned such that a transverse distance (D) between the ports in the pair is less than 1.5 times the height of the highest secondary air port of the pair.

34. A furnace in accordance with claim 33 wherein the transverse distance is in a range of 0.075 meters (m) to 0.16 m.

35. A furnace in accordance with claim 23 wherein the air supply is connected to a source of flue gas taken from the recovery boiler.

36. A furnace in accordance with claim 23 wherein the air supply is connected to a line for odorous gases for introducing the gases to the furnace.

37. A furnace in accordance with claim 1, wherein the secondary air ports at the first horizontal elevation differ in elevation by no more than ten percent of a depth of the furnace, and the secondary air ports at the second horizontal elevation differ in elevation by no more than ten percent of the depth of the furnace.

38. A furnace of a recovery boiler comprising:

a front wall, a rear wall and side walls to the furnace, at least one black liquor spraying device disposed at or above a black liquor spray horizontal elevation on at least one of said walls, wherein said black liquor spray horizontal elevation is substantially devoid of air ports;

a plurality of primary air ports on at least one of said walls;

a first horizontal elevation of secondary air ports arranged on opposite walls of said furnace and a second horizontal elevation of secondary air ports on said opposite walls, wherein substantially all secondary air enters the furnace through said ports in the first and second horizontal elevations and said first and second horizontal elevations of secondary air ports are vertically lower on said walls than the black liquor horizontal spray elevation and are vertically above the primary air ports;

the secondary air ports in each of said first and second horizontal elevations on said opposite walls are such that the air ports for each horizontal elevation project a pattern of air jets into the furnace from said opposite walls;

wherein the secondary air ports for the first horizontal elevation each form a vertical centerline laterally offset from a vertical centerline of an adjacent secondary air port in the second horizontal level, and the offset is a transverse distance (D) that is less than 1.5 times H or less than 1.5×W, where H is a height of a tallest secondary air port and W is a width of a widest secondary air port.

39. A furnace in accordance with claim 38, wherein the transverse distance (D) is in a range of 0.075 meters to 0.16 meters.

40. A furnace in accordance with claim 38, wherein an air supply to the secondary air ports is in fluid communication with flue gas from the recovery boiler to recirculate a portion of the flue gas to the furnace.

41. A furnace in accordance with claim 38, wherein an air supply for the secondary air ports is in fluid communication with a supply of odorous gases for introducing the odorous gases to the furnace.

42. A furnace as in claim 38 wherein the secondary air ports each have an area A and a width W, and a ratio of A to $W^2$ is at least four.

43. A furnace in accordance with claim 42 wherein the ratio of A to $W^2$ is more than ten.

44. A furnace in accordance with claim 38 wherein the furnace has at least one elevation of tertiary air ports arranged above the black liquor sprayer, and wherein a number of tertiary air ports on said at least one elevation of tertiary air ports is greater than a number of secondary air ports on an upper elevation of the first horizontal elevation and the second horizontal elevation.

45. A furnace in accordance with claim 44 wherein a vertical distance between the at least one tertiary air elevation and the black liquor sprayer is more than two meters.

46. A furnace in accordance with claim 38 wherein an air velocity through the secondary air ports is at least 40 m/s.

47. A furnace in accordance with claim 38, wherein the air ports of said first and second horizontal secondary air elevations are located on the front and rear walls of the furnace.

48. A furnace in accordance with claim 38, wherein the secondary air ports at the first horizontal elevation differ in elevation by no more than ten percent of a depth of the furnace, and the secondary air ports at the second horizontal elevation differ in elevation by no more than ten percent of the depth of the furnace.

49. A furnace of a recovery boiler comprising:

a front wall, a rear wall and side walls to the furnace, at least one black liquor spraying device disposed at or above a black liquor spray horizontal elevation on at least one of said walls, wherein said black liquor spray horizontal elevation is substantially devoid of air ports;

a plurality of primary air ports on at least one of said walls;

a first horizontal elevation of secondary air ports arranged on opposite walls of said furnace and a second horizontal elevation of secondary air ports on said opposite walls, wherein substantially all secondary air enters the furnace through said ports in the first and second horizontal elevations, and said first and second horizontal elevations of secondary air ports are vertically lower on said walls than the black liquor horizontal spray elevation and are vertically above the primary air ports, wherein the secondary air ports jet the secondary air in a substantially horizontal plane at each of the first and second horizontal elevations;

a plurality of the secondary air ports on the first horizontal elevation are substantially vertically aligned with a corresponding plurality of secondary air port on the second horizontal elevation;

the secondary air ports in each of said first and second horizontal elevations on said opposite walls are such that the air ports for each horizontal elevation project a pattern of air jets into the furnace from said opposite walls, wherein the secondary air ports at the first horizontal elevation differ in elevation by no more than ten percent of a depth of the furnace, and the secondary air ports at the second horizontal elevation differ in elevation by no more than ten percent of the depth of the furnace.

50. A furnace of a recovery boiler comprising:

a front wall, a rear wall and side walls to the furnace, at least on black liquor spraying device disposed at or above a black liquor spray horizontal elevation on at least one of said walls, wherein said black liquor spray horizontal elevation is substantially devoid of air ports;

a plurality of primary air ports on at least one of said walls;

a first horizontal elevation of secondary air ports arranged on opposite walls of said furnace and a second horizontal elevation of secondary air ports on said opposite walls, wherein substantially all secondary air enters the furnace through said ports in the first and second horizontal elevations and said first and second horizontal elevations of secondary air ports are vertically lower on said walls than the black liquor horizontal spray elevation and are vertically above the primary air ports;

the secondary air ports in each of said first and second horizontal elevations on said opposite walls are such that the air ports for each horizontal elevation project a pattern of air jets into the furnace from said opposite walls;

wherein substantially no secondary air is introduced through walls of the furnace other than through the opposite wall, wherein the secondary air ports at the first horizontal elevation differ in elevation by no more than ten percent of a depth of the furnace, and the secondary air ports at the second horizontal elevation differ in elevation by no more than ten percent of the depth of the furnace.

51. A furnace in a recovery boiler comprising:

walls around a combustion area of the furnace, wherein said walls include a first and second wall opposite each other;

at least one black liquor sprayer disposed on one or more of walls at a black liquor spray elevation on said walls wherein said black liquor spray elevation is devoid of air ports; and a plurality of secondary air ports arranged in two elevational rows on said first and second opposite walls, said secondary air ports provide horizontal jets of substantially all secondary air into the furnace and the jets from opposite walls interlace to form secondary air circulation aligned substantially horizontally in the furnace, wherein said rows of secondary air ports are above on said walls and elevation of primary air ports and below the black liquor spray elevation, said secondary air ports in each row are vertically aligned with the secondary air ports in the other row on the same wall;

in each row, jets of secondary air project from the ports in the first wall and jets of secondary air project from the second wall, and the jets project substantially horizontally into the furnace, and the secondary air ports each have an area A and a width W, and a ratio of A to $W^2$ is at least four, wherein the secondary air ports at each of said two elevational rows differ in elevation by no more than ten percent of a depth of the furnace.

52. An arrangement for supplying secondary air to a furnace for a recovery boiler furnace wherein:

said furnace comprises a front wall, a rear wall and side walls, a black liquor spray device disposed on at least one of said walls at a black liquor injection horizontal elevation and a plurality of air ports located on a plurality of horizontal elevations on at least two of said walls for introducing air into the furnace from an air supply, said arrangement for supplying secondary air comprising first and second horizontal secondary air elevations at different elevations within the furnace arranged above a primary air elevation and below the black horizontal level;

secondary air jets are supplied from secondary air ports on two opposite walls on said two horizontal secondary air elevations and the secondary air ports are located on said opposite walls such that the secondary air jets form an interlaced pattern in the furnace, wherein the secondary air ports project the secondary air jets substantially horizontally into the furnace, and the air jets of said first and second horizontal secondary air elevations are located substantially one above the other in substantially vertical columns of air ports, wherein a number of secondary air ports in each of said substantially vertical columns is no more than a pair of secondary air ports, wherein the secondary air ports at the first horizontal elevation differ in elevation by no more than ten percent of a depth of the furnace, and the secondary air ports at the second horizontal elevation differ in elevation by no more than ten percent of the depth of the furnace.

53. An arrangement for supplying secondary air to a furnace for a recovery boiler furnace wherein:

said furnace comprises a front wall, a rear wall and side walls, a black liquor spray device disposed on at least one of said walls at a black liquor injection horizontal elevation and a plurality of air ports located on a plurality of horizontal elevations on at least two of said walls for introducing air jets into the furnace from an air supply, and said arrangement for supplying secondary air jets comprising first and second horizontal secondary air elevations at different elevations arranged above a primary air elevation and below the black horizontal level, wherein the secondary air jets project substantially horizontally into the furnace, and the secondary air jets of said first and second horizontal secondary air elevations are located substantially one above the other in substantially vertical columns of air jets, wherein no more than two secondary air jets are vertically aligned, wherein the first horizontal elevation includes secondary air ports at elevations within the furnace that differ by no more than ten percent of a depth of the furnace, and the second horizontal elevation includes secondary air ports at elevations within the furnace that differ by no more than ten percent of the depth of the furnace.

* * * * *